United States Patent [19]
Jardin et al.

[11] Patent Number: 5,344,603
[45] Date of Patent: Sep. 6, 1994

[54] PROCESS FOR THE PRODUCTION OF A COVER UNIT WITH A SEAL FOR VEHICLE ROOFS AND COVER UNIT FOR VEHICLE ROOFS

[75] Inventors: Hans Jardin, Inning; Harald Strunk, Plettenberg, both of Fed. Rep. of Germany

[73] Assignee: Webasto-Schade GmbH, Oberpfaffenhofen, Fed. Rep. of Germany

[21] Appl. No.: 843,188

[22] Filed: Feb. 28, 1992

[30] Foreign Application Priority Data

Feb. 28, 1991 [DE] Fed. Rep. of Germany ....... 4106252

[51] Int. Cl.$^5$ ............................................. B29C 39/10
[52] U.S. Cl. .................................... 264/261; 264/252; 264/275
[58] Field of Search .................. 264/252, 261, 46.4, 264/46.5, 275, 278, 271.1

[56] References Cited

U.S. PATENT DOCUMENTS

| | | | |
|---|---|---|---|
| 3,026,575 | 3/1962 | Lusher et al. | 264/261 |
| 3,037,810 | 6/1962 | Kelley | 264/261 |
| 4,738,482 | 4/1988 | Boehm et al. | 296/216 |
| 4,834,931 | 5/1989 | Weaver | 264/261 |
| 4,847,024 | 7/1989 | Loren | 264/46.4 |
| 5,069,849 | 12/1991 | Wain | 264/261 |
| 5,069,852 | 12/1991 | Leone et al. | 264/252 |
| 5,127,193 | 7/1992 | Okada et al. | 264/261 |
| 5,129,807 | 7/1992 | Oriez et al. | 264/252 |
| 5,207,957 | 5/1993 | Heath et al. | 264/261 |

FOREIGN PATENT DOCUMENTS

| | | |
|---|---|---|
| 3742719 | 7/1989 | Fed. Rep. of Germany . |
| 63-041765 | 8/1988 | Japan .................................. 264/261 |
| 90012943 | 11/1990 | PCT Int'l Appl. ................. 264/252 |

*Primary Examiner*—Allan R. Kuhns
*Attorney, Agent, or Firm*—Sixbey, Friedman, Leedom & Ferguson

[57] ABSTRACT

A process for the production of a cover unit with a seal for vehicle roofs in which a cover part, such as a glass cover part, a cover support and a profile part, having a replacement seal receptacle are inserted in a mold having an upper part and a lower part. The profile part is spaced from the cover part and the support leaving edge gaps which are filled by introducing an elastomer therein to connect this assembly to a cover unit. The profile part is attached and aligned, in a preferred embodiment, by attaching projections on the upper part and/or lower part of the mold depending on its position in the production of the cover unit. A peripheral seal can be molded on the profile part.

This peripheral seal can be removed from the profile part, so that the seal receptacle of the profile part can be used to insert a replacement seal. Also, a resulting cover unit for vehicle roofs comprises a cover part, a cover support and a profile part with a replacement seal receptacle and an, optionally, molded-on peripheral seal. The cover part and cover support are connected to the profile part by an elastomer to form a cover unit.

11 Claims, 2 Drawing Sheets

PROCESS FOR THE PRODUCTION OF A COVER UNIT WITH A SEAL FOR VEHICLE ROOFS AND COVER UNIT FOR VEHICLE ROOFS

BACKGROUND OF THE INVENTION

The invention relates to a process for the production of a cover unit with a seal for vehicle roofs, in which at least one cover part and one cover support are placed in a mold comprising an upper part and a lower part, and with mold closed, an elastomer is introduced, which fills edge gaps between the cover part and the cover support, and connects them into a cover unit. Furthermore, a peripheral seal can be provided on this cover unit. The invention further relates to a cover unit for vehicle roofs as produced by such a method.

A process for the production of an assembly comprising a cover and seal for vehicle roofs of the above-mentioned type is known from German Offenlegungsschrift DE 37 42 719 A1. In this process, a cover part, such as a glass cover, and a cover support, together with a seal having a sealing element having an inwardly directed projection, are inserted in a mold comprising an upper part and a lower part so that the seal is applied with its outside edge against the inside edge of the mold, the projection projects between the cover support, and the cover part and edge gaps remain open between the outside edges of the cover part and cover support as well as inside wall parts of the sealing element, and these gaps are connected to one another through holes in the projection of the seal. Then, the mold is closed, and an elastomer injected into the mold so as to fill the edge gaps and mutually connect the cover part, cover support and seal. Thus in this production process, a unit of a cover part, cover support and a seal is formed by the elastomer used as a molding compound. In an assembly produced in this way, the adherence to narrow tolerances in the outside dimensions of the produced assembly causes difficulties, since the sealing element of the inserted seal rest against a wall of the mold and therefore, can be deformed when introducing the elastomer, so that great tolerance fluctuations in the outside dimensions can hardly can be avoided. Further, the mold for the production of the assembly has several undercuts, as a result of which the production of the mold becomes more expensive. Especially when the seal is damaged or becomes worn with time with use of the assembly as a cover for a vehicle roof, the entire assembly has to be replaced, even though only the peripheral seal or the edge gap seal would, otherwise, require replacement. The assembly is, therefore, not very easy to maintain.

A rigid cover for a vehicle roof is known from German Patent 35 06 009 C2, in which a cover plate and a reinforcing frame placed underneath it are molded into a one-piece continuous plastic frame to minimize the production tolerances of the outside measurements of a cover for vehicle roofs. This plastic frame, at the same time, forms an upper frame and has molded-on fastening elements for a seal or a sealing element. The procedure described there is relatively complicated because, after the molding process, the seal has to be introduced in a groove formed in the plastic frame. Further, the plastic frame projects over the cover plate, which is disadvantageous for aesthetic reasons, as well as with respect to wind noises and dirt accumulations. Apart from that, the mold also requires several undercuts, which contribute to a cost increase in the production of the mold. Further, in this case, relatively great tolerance fluctuations in the outside dimensions of such a rigid cover can also hardly be avoided, since at least the tolerances of the sealing receptacle area and the tolerances of the seal are cumulative.

SUMMARY OF THE INVENTION

The object of the invention is, therefore, to overcome the above-described difficulties, and to a process for the production of a cover unit with a seal for vehicle roofs in which, in a production engineering and economical way, narrow tolerance ranges with respect to the outside dimensions of the cover unit can be maintained with a seal and if necessary, the seal can be quickly and easily replaced.

According to the invention, these objects are achieved by a process for the production of a cover unit with a seal for vehicle roofs in which at least one cover part and one cover support are placed in a mold, comprising an upper part and a lower part, so as to leave open edge gaps when the mold is closed, and into which an elastomer is introduced. The elastomer fills the edge gaps and connects the cover part with the cover support into a cover unit on which a peripheral seal can be provided. Additionally, a profile part that forms a sealing receptacle is placed in the mold at a distance from the arrangement consisting of the cover part and cover support. This profile part is made of a harder material than the elastomer that is injected into the mold, and the profile part is positionally fixed when the mold is closed.

With the process according to the invention, a cover unit is thus provided, which has at least one sealing receptacle, which is formed by the profile part, which is inserted in the mold so that it is fixed with respect to its position when the mold is closed. In this way, it is achieved that, in the production of the cover unit, without making the mold significantly more complicated, outside dimensions can be maintained with very narrow tolerance ranges, by which the production accuracy can be significantly improved. This is basically attributable to the positional fixing of the profile part, which cannot be displaced when the elastomer is filled in during the production process according to the invention. Thus, with the production process according to the invention, an interconnection of the cover part, cover support and profile part is produced with exactly predetermined outside dimensions. Since the profile part forms a sealing receptacle, a seal to be installed there, optionally, can be easily and quickly replaced, so that such a cover unit is also made easy to maintain.

Preferably, attaching projections are provided, according to the invention, on the lower part and/or on the upper part of the mold for positional fixing, which come in contact with the inserted profile part. In such an embodiment, it is achieved that, in the closing movement of the mold, also, a relative alignment of the profile part in conjunction with the projections being used for positional fixing is achieved between the lower part and the upper part of the mold. Since the means for positional fixing, thus, are mold-resistant, the adherence to narrow tolerances can also be assured in mass production. Preferably, the attaching projections come in contact with the profile part on the side facing away from the arrangement of the cover part and cover support, so that the elastomer used for the production of the connecting unit can get to as large as possible areas to be connected. The attaching projections thus hold the profile part, seen from its exterior.

The profile part with the sealing receptacle can be designed as one piece or several parts. This depends basically on the embodiment of the receptacle area for the seal.

Preferably, the profile part has a C-shaped cross section, whose open side points outward, and which delimits the sealing receptacle space. In this case, a sealing receptacle space, which has undercuts on the profile part, is obtained, so that a reliable immobilization of the peripheral seal is possible also when a cavity seal is used, but no undercuts on the mold are necessary in the design of such a sealing receptacle space. According to a preferred embodiment of the process according to the invention, a cavity for receiving the seal is made in the mold, which is separated and sealed relative to the cover unit. This cavity can be used to receive a corresponding seal attached to the profile part.

Preferably, in doing so, the attaching projections for the profile part separate and seal the cavity for receiving the seal. Suitably, the process sequence is selected so that in a preliminary step the seal is molded on the profile part and the unit comprising the profile part and the seal is placed in the mold so that after the production the cover unit can be removed as a unit from the mold with the molded-on seal. Thus, a prefabricated cover unit with a seal can be obtained in a simple way. If the seal is damaged during the use of the cover unit in a vehicle roof, the seal molded on the profile part can be torn off and removed, and then a replacement seal can be quickly and easily inserted in the sealing receptacle of the profile part, so that considerable advantages also result with respect to the maintenance expenditure with this method of production.

Preferably, the cavity for receiving the seal is, for the most, part defined by the lower part of the mold, and the lower part in this case has an undercut. This undercut on the under part of the mold is used, when a seal is molded on the profile part, for holding the cover unit with seal, when the mold is opened for removing the produced cover unit with a seal.

According to another embodiment according to the invention, a cover unit for vehicle roofs with a cover part and a cover support is also provided, which are connected by an elastomer to a unit, and is provided with a seal provided on the outside edge, and the cover unit is distinguished in that a profile part made of a material harder than the elastomer is connected by the elastomer with the cover unit, and the profile part has a sealing receptacle. Such a cover unit can be produced with relative precision in particular with respect to the outside dimensions, and the areas of the cover part covered by the elastomer, which are visible outward and/or inward, can be reduced as much as possible to obtain an aesthetically appealing exterior of such a cover unit for vehicle roofs.

Preferably, the seal that is molded on the profile part is formed by a cavity seal. To reduce the maintenance expenditure for replacing a damaged seal, the molded-on seal can, preferably, be removed from the profile part, so that a replacement seal can, then, be quickly and easily inserted in the sealing receptacle of the profile part.

These and further objects, features and advantages of the present invention will become apparent from the following description when taken in connection with the accompanying drawings which show, for purposes of illustration only, several embodiments in accordance with the present invention.

DETAILED DESCRIPTION OF THE PREFERRED EMBODIMENT

Figure 1:
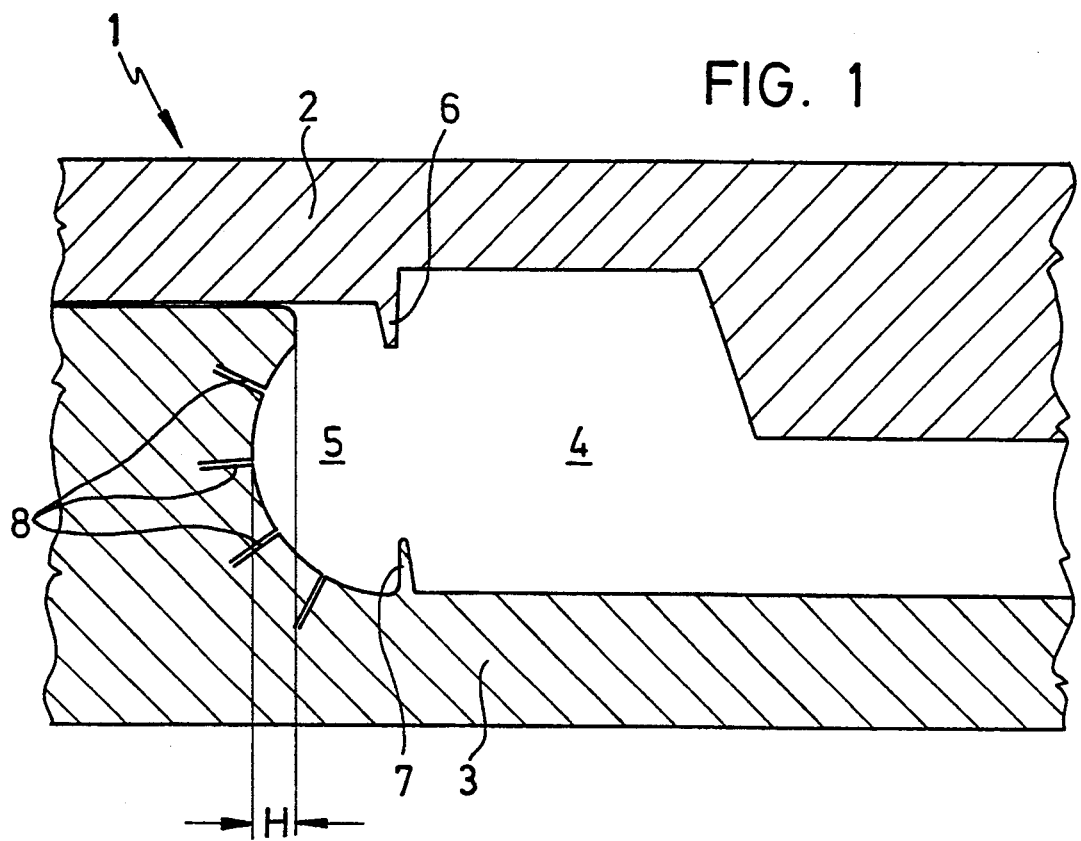
FIG. 1 is a sectional view of a mold for the production process according to the invention without inserted parts.
Figure 2:
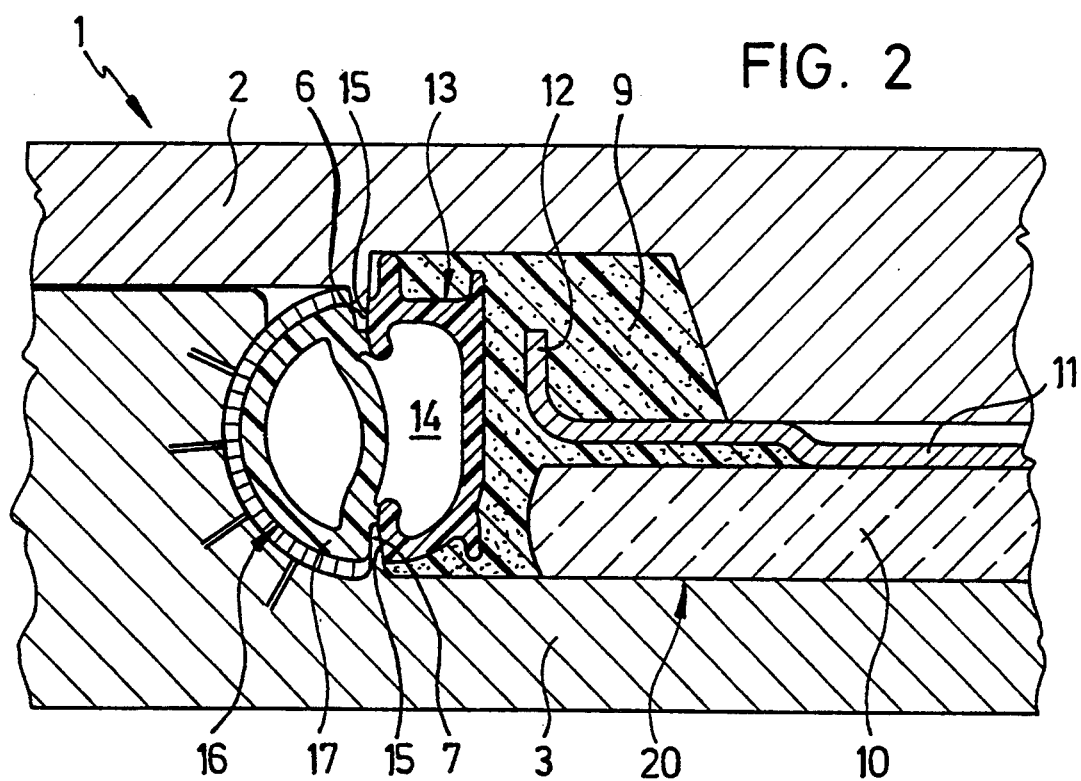
FIG. 2 is a sectional view of a mold for the production process according to the invention in a closed condition and with parts inserted and connected to a cover unit.

In the figures of the drawing, the same or similar parts are provided with the same references. With reference to FIGS. 1 and 2, the process for the production of a cover unit with a seal for vehicle roofs will be explained first. Such a cover unit is intended, for example, for vehicle roofs of any type that can be opened, and which can be, for example, lifting roofs, sliding roofs, sliding-lifting roofs, spoiler roofs and the like.

In FIG. 1 of the drawing, a preferred embodiment of a mold designated 1 as a whole is represented without the individual parts of the cover unit. The mold has an upper part 2 and a lower part 3. In the part of the mold cavity space of mold 1 designated 4, the parts of the cover unit to be connected to a unit, namely a cover part, a cover support and a profile part, are placed as can be seen in more detail from FIG. 2. Space 4 is bounded by attaching projections 6 and 7, attaching projection 6 being formed in upper part 2 and attaching projection 7 in lower part 3 of mold 1. Another space 5, which can be used for receiving a peripheral seal attached to a profile part 13 adjoins space 4 being separated and sealed relative thereto by attaching projections 6 and 7, when the profile part 13 is in place. As shown, basically only one undercut H is formed in mold 1, which is in the area of space 5 for receiving the peripheral seal.

If upper part 2 and lower part 3 of mold 1 in FIG. 1 are moved away from one another, i.e., mold 1 is opened, a cover part 10, which can be produced, for example, from a transparent material such as a glass, a cover support 11, which can be produced, for example, of a metal material and having an upright flange 12, and at least one profile part 13, are inserted in mold space 4. As shown in FIG. 2, the profile part 13 is placed in space 4 at a distance from the arrangement of cover support 11 and cover part 10. Profile part 13 is suitably produced from a relatively hard material and has such a shape that an undercut seal receptacle 14 is formed in it. A peripheral seal 16 is attached to profile part 13 and is received in space 5 of mold 1. Cover part 10, cover support 11 and profile part 13 together with seal 16 are properly aligned in the mold 1, preferably on lower part 3 of mold 1. In the illustrated case, profile 13 is annular or at least C-shaped when viewed from above, and its lower outwardly facing side 15 sloped upwardly outwardly in conformance with the slope of the facing inner surface of projection 7, so as to support itself thereon above the bottom wall surface of the part of the mold cavity difining space 4, as shown in FIG. 2. Mold 1 is then closed, for example, by upper part 2 being moved toward, fixed lower part 3. In this closing movement, profile part 13 becomes fully seated against attaching projections 6, 7, so that the profile part 13 is fixed in place within the mold cavity space 4.

In the represented example, attaching projections 6, 7 come into contact with parts of each outer side 15 of profile part 13, which faces away from the arrangement of cover part 10 and cover support 11, so that, as can be seen in FIG. 2, profile part 13 acts together with projections 6, 7 to insure that space 4 is tightly closed relative to space 5. At the same time, profile part 13 is aligned in the arrangement determined by attaching projections 6, 7 when the mold is closed.

After the closing of mold 1, an elastomer 9 is then introduced with the help of conventional injection devices (not represented), so as to fill the edge gaps between cover part 10, cover support 11 and profile part 13, so that a cover unit made from cover part 10, cover support 11 and profile part 13 is obtained with attached seal 16, wherein profile part 13 has a seal receptacle 14. In the previously explained production process, the basic design is involved in which a cover unit made from cover part 10, cover support 11, profile part 13 and seal 16 is produced.

Seal 16 is designed in the represented example as a cavity seal 17. For the production of peripheral seal 16, a suitably softer material than that of profile part 13 is used. Peripheral seal 16 may be molded directly on profile part 13.

The shape of peripheral seal 16 can be matched to the respectively desired requirements, so that the invention is not limited to the details explained based on FIG. 1 and 2.

Since with the process according to the invention a cover unit with a seal of the above-mentioned type is produced with the help of mold 1, and profile part 13 is positionally fixed, narrow tolerances in the outside dimensions of such a cover unit can be safely adhered to. Further, for the production of the connection between cover part 10, cover support 11 and profile part 13 by flange 12 of cover support 11, elastomer 9 covers only a small part of the cover part in the edge area of the same, and a planar end of the cover part and elastomer 9 is present toward one side, so that a cover unit produced in such a way even with molded-on peripheral seal 16 has an aesthetic exterior and can be designed in a flat construction.

Figure 3:
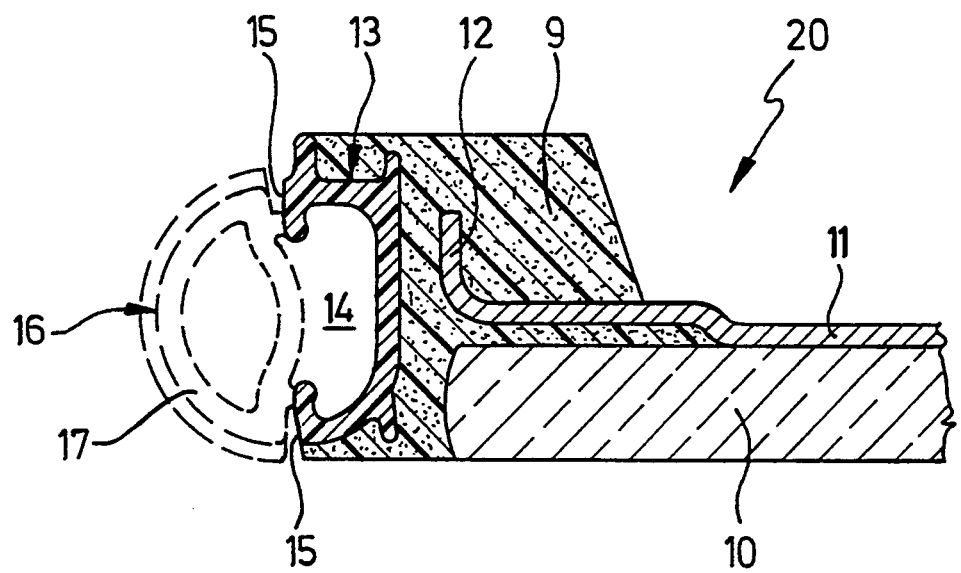
FIG. 3 is a partial sectional view of a first embodiment of a cover unit with a molded-on peripheral seal being shown in phantom outline.

In FIG. 3, a cover unit 20 produced according to the process of the invention is separately represented as a preferred embodiment. In dashed lines, the above-described peripheral seal 16, molded directed on profile part 13, is illustrated there as being optional. This cover unit 20 comprises, with reference to the above explanation, cover part 10, cover support 11 and flange 12, and at least profile part 13. Alternatively, peripheral seal 16 can be directly molded on profile part 13 prior to molding of part 13 into the cover unit.

Figure 4:
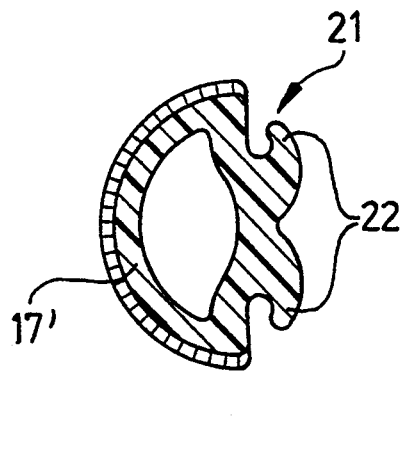
FIG. 4 is a sectional view of an example of a replacement seal.

In FIG. 4, an example of a replacement seal is shown, which is designated in its entirety with 21. If peripheral seal 16, molded directly on profile part 13 corresponding to FIG. 3, is damaged or worn out, the latter can be removed at the junction points, for example, by pulling off peripheral seal 16 from profile part 13. Then, seal receptacle 14, which is formed and limited by profile part 13, is uncovered, and replacement seal 21 (shown in FIG. 4) can then be inserted in seal receptacle 14. Replacement seal 21 is made basically similar to peripheral seal 16 and is also designed as cavity seal 17'. Further, replacement seal 21 comprises finger-shaped projections 22 (see FIG. 3) which are pressed into seal receptacle 14 of profile part 13, and then engage behind the undercuts of seal receptacle 14, so that replacement seal 21 is safely fixed to profile part 13. Since a very wear-prone part, which is exposed especially also to all weather conditions, is involved in peripheral seal 16, it can thus be achieved in the design of cover unit 20 according to the invention that, for example, molded peripheral seal 16 can be replaced quickly and easily by replacement seal 21 shown in FIG. 4.

Figure 5:
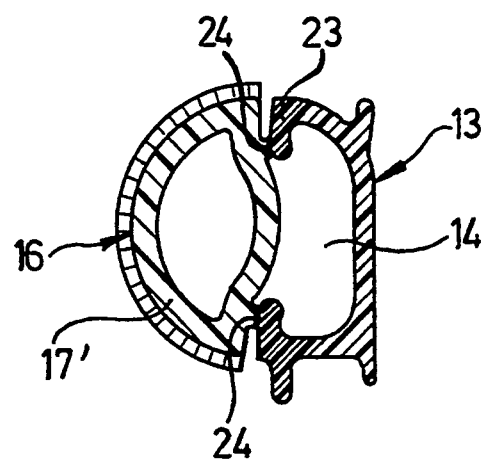
FIG. 5 a sectional view to illustrate a modified embodiment of a unit made of a profile part and molded-on peripheral seal.

In FIG. 5, a modified embodiment of a connection of a profile part 13' to a peripheral seal 16 is illustrated. Profile part 13' differs from the profile part 13, explained above, basically in that portions 23 of profile part 13' are harder than are other parts of the body of profile part 13'. Peripheral seal 16 is fastened to these harder areas 23 by a thin connecting film 24. In this design shown in FIG. 5, it is achieved, by the fastening via thin connecting film 24, that peripheral seal 16 can be removed more easily from harder areas 23 of profile part 13'. If a replacement seal, for example, replacement seal 21 shown in FIG. 4, then is inserted in profile part 13', harder areas 23 are further used to hold replacement seal 21 more firmly in sealing receptacle 14 and to integrate and secure it against a removal. Further, the inserting of replacement seal 21, if necessary, is facilitated because of the very different elasticity properties between harder areas 23 of profile part 13' and those of replacement seal 21.

Of course, the invention is not limited to the above-described details either with respect to the production process or to cover unit 20 since numerous changes and modifications, which would be apparent to one skilled in the art from the foregoing as being within the scope of the inventive concept, are possible. For example, profile part 13, 13' can also have a different shape, provided that it is guaranteed that this profile part 13, 13' can be reliably anchored in elastomer 9 with a secure hold, and on the other hand, a sealing receptacle 14 is provided with a configuration that guarantees a secure fixing of a replacement seal 21. With the process according to the invention, the fact is essential is that a profile part 13, 13' is used as an insert for a mold 1, which combines several functions. With respect to the narrow tolerances, to be adhered to according to the invention, for the outside dimensions of cover unit 20, it is further essential that this profile part 13, 13' is positionally fixed in mold 1.

However, depending on the position of the mold during production of the cover unit, it is, also, possible to attach and align the profile part using an attaching projection on only one or the other of the two mold parts, instead of on both. We, therefore, do not wish to be limited to the details shown and described herein, but intend to cover all such changes and modifications as are encompassed by the scope of the appended claims.

We claim:

1. Process for the production of a cover unit with a peripheral seal for vehicle roofs, comprising the steps of:

A) providing a mold having a mold cavity having adjoining first and second mold spaces which open into each other;

B) placing at least one cover part and a cover support in said mold with an edge area thereof extending into said first mold space;

C) arranging a seal-receiving part, having an outwardly directed seal receptacle in which a resiliently compressible peripheral seal is mountable, in said first mold space at a distance from said cover part and said cover support so as to leave a connection-forming gap in the mold between them and the seal-receiving part, said seal-receiving part being positioned so as to isolate said second mold space from said first mold space and being oriented with said seal receptacle facing into said second mold space;

D) closing the mold and introducing an elastomer into the mold so as to fill the connection-forming gap and connect the cover part and cover support into a unit with the seal-receiving part, the elastomer introduced being made of a softer material than the seal-receiving part and being prevented from entering into said second mold space by said seal-receiving part;

wherein a resiliently compressible peripheral seal is disposed in said second mold space covering the seal receptacle of said seal-receiving part during said step D, and said seal-receiving part being positionally fixed so as not to be displaced during introduction of said elastomer, thereby preventing compression of said compressible peripheral seal by the elastomer being introduced.

2. Process according to claim 1, wherein attaching projections are provided on at least one of the lower part and the upper part of mold for positionally fixing the seal-receiving part; and wherein the seal-receiving part is arranged in contact therewith.

3. Process according to claim 2, wherein sides of the seal-receiving part facing away from the cover part and cover support are arranged in contact with the attaching projections.

4. Process according to claim 3, wherein the arranging of the seal-receiving part in contact with the attaching projections of the mold forms a mold cavity area for receiving a peripheral seal which is separated and sealed relative to a main cavity area in which said unit is formed.

5. Process for the production of a cover unit with a peripheral seal for vehicle roofs, comprising the steps of:

A) providing a mold having a mold cavity having adjoining first and second mold spaces which open into each other;

B) placing at least one cover part and a cover support in said mold with an edge area thereof extending into said first mold space;

C) arranging a seal-receiving part, having an outwardly directed seal receptacle in which a resiliently compressible peripheral seal is mountable, in said first mold space at a distance from said cover part and said cover support so as to leave a connection-forming gap in the mold between them and the seal-receiving part, said seal-receiving part being positioned so as to isolate said second mold space from said first mold space and being oriented with said seal receptacle facing into said second mold space;

D) closing the mold and introducing an elastomer into the mold so as to fill the connection-forming gap and connect the cover part and cover support into a unit with the seal-receiving part, the elastomer introduced being made of a softer material than the seal-receiving part and being prevented from entering into said second mold space by said seal-receiving part; wherein said seal-receiving part is positionally fixed so as not to be displaced during introduction of said elastomer; wherein said mold has upper and lower mold parts; and wherein said positional fixing of the seal-receiving part is produced by an attaching projection extending from each of said mold parts into the mold cavity at the junction of said first and second mold spaces, said seal-receiving part sealingly engaging against said attaching projections during introduction of said elastomer.

6. Process according to claim 5, wherein said seal-receiving part, prior to being arranged in the mold, has molded thereon a peripheral seal.

7. Process according to claim 6, wherein the peripheral seal molded on the seal-receiving part is formed as a cavity seal.

8. Process according to claim 7, wherein said peripheral seal is molded onto the seal-receiving part in a removable manner.

9. Process according to claim 8, wherein said peripheral seal is molded onto the seal-receiving part over said seal receptacle.

10. Process according to claim 7, wherein the lower part of the mold defines substantially the full height of the peripheral seal and has an undercut surface corresponding to an outer contour thereof.

11. Process according to claim 5, further comprising the step of removably attaching a peripheral seal to the seal-receiving part element over said seal receptacle using a thin connecting film.

* * * * *